United States Patent [19]

Tureck

[11] 4,146,918
[45] Mar. 27, 1979

[54] PHOTOGRAPHIC FLASH REFLECTOR AND DIFFUSER SYSTEM

[76] Inventor: Albert Tureck, 3728 W. Enfield, Skokie, Ill. 60076

[21] Appl. No.: 870,328

[22] Filed: Jan. 18, 1978

[51] Int. Cl.² ............................................. G03B 15/02
[52] U.S. Cl. ..................................... 362/16; 362/347; 362/352; 362/355
[58] Field of Search .................. 362/16, 347, 352, 355

[56] References Cited

U.S. PATENT DOCUMENTS 4,075,472  8/1978  Higuchi ................................. 362/352

Primary Examiner—Stephen J. Lechert, Jr.
Attorney, Agent, or Firm—George H. Gerstman

[57] ABSTRACT

A reflector or diffuser system is provided for an electronic flash unit. The system comprises an inflatable pillow having a front ply and a back ply with a valve carried by the pillow for enabling inflation thereof. A resilient strap is used for securing an electronic flash to the pillow by overlying the electronic flash and urging it tightly against one of the plies. A filter is removably connected between the one ply and the face of the electronic flash.

19 Claims, 6 Drawing Figures

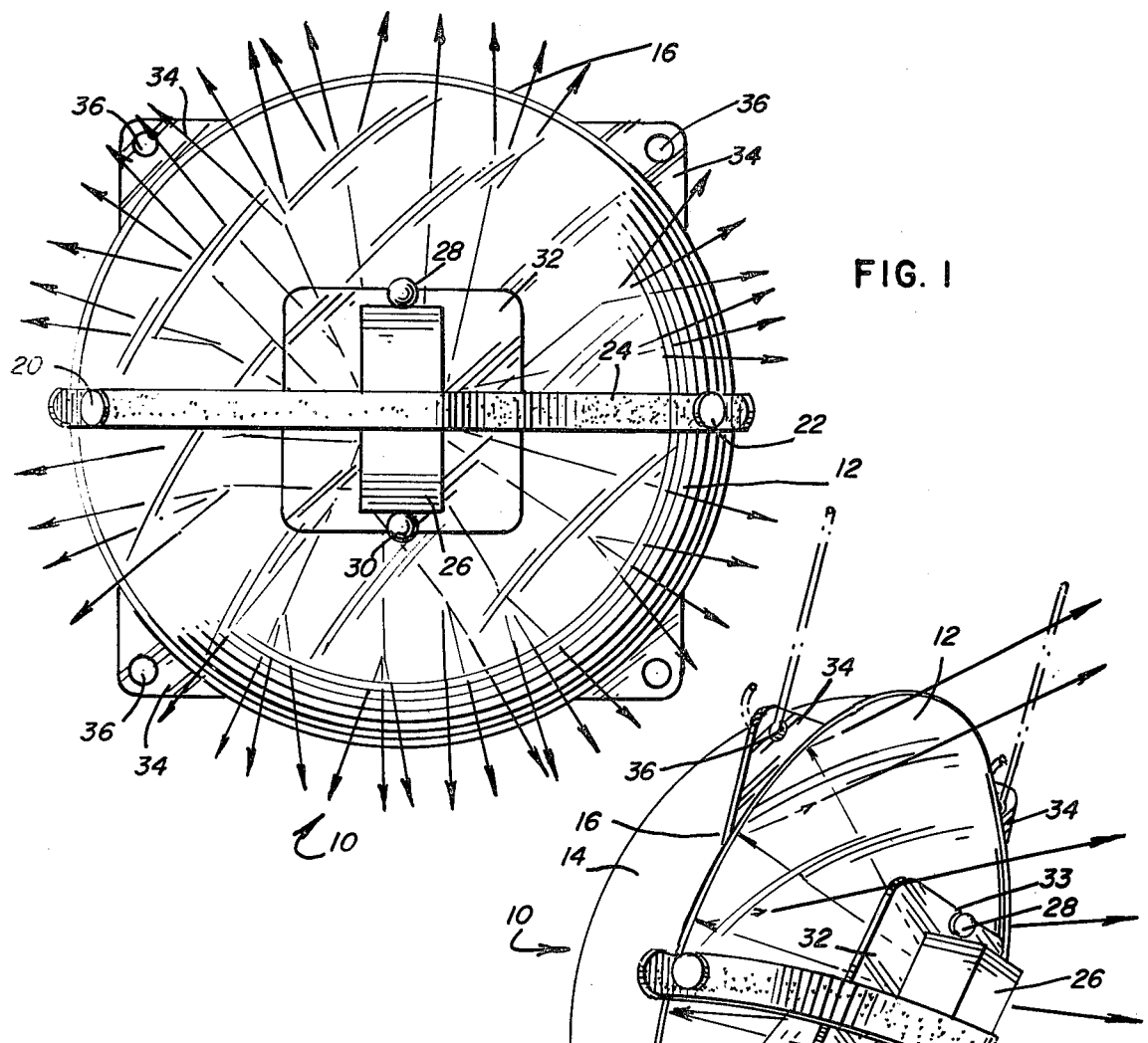
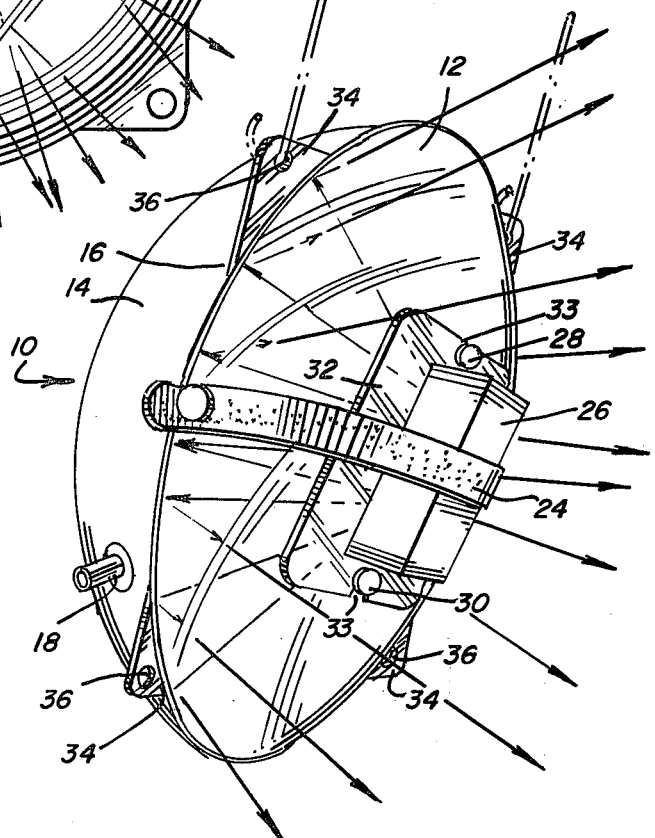
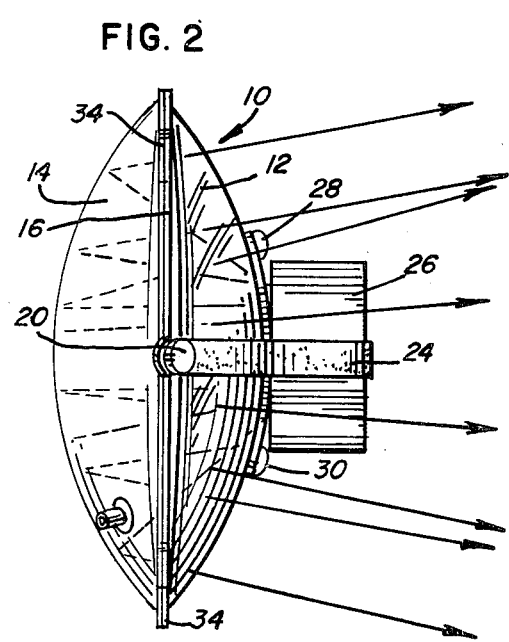
FIG. 1
FIG. 2
FIG. 3

PHOTOGRAPHIC FLASH REFLECTOR AND DIFFUSER SYSTEM

BACKGROUND OF THE INVENTION

The present invention concerns a novel reflector or diffuser system for an electronic flash.

In order to soften the light emitted by an electronic flash, a reflector in the form of an umbrella having a reflective inside surface is often employed. To this end, the face of the electronic flash is directed toward the reflective surface of the umbrella so that the flash will be bounced off the reflective surface. While such reflective umbrellas have been found to be useful in softening the light from the electronic flash and providing adequate bounce light, these reflectors are relatively expensive and cumbersome.

Because of the expense and complexity of the umbrella type reflective units, many photographers avoid the purchase and/or use of such units. In particular, such units cannot fit into the ordinary gadget bag carried by a photographer. Further, in order for the umbrella type reflective units to be positioned properly, they must generally be connected to a stand which is also relatively expensive and cumbersome.

On occasion, photographers will want the reflected light to have a particular color quality. For example, while most reflector units have a white or silver reflective surface, reflector units have been sold with gold reflective surfaces in order to provide a softer color. While it is desirable for a reflector unit to be able to reflect different colors under different circumstances, The expense of purchasing various reflector units having different colored reflective surfaces is prohibitive.

I have discovered a novel reflector or diffuser system in which a filter may be simply attached in order to provide reflected or diffused light of selected colors. My invention avoids the need to purchase a different reflector unit for each different color desired.

One reflector unit, which has been demonstrated outside of the United States, comprises an inflatable pillow having a transparent front surface to which an electronic flash unit is attached and having a reflective rear surface from which the light emitted by the electronic flash unit is reflected. While this device has certain advantages, the system for connecting the electronic flash to this device is complex and presents several problems. For example, the connection system includes a number of straps which extend radially outward from the flash to the periphery of the pillow. The area from which the straps extend comprises a hood which is placed over the electronic flash unit in an attempt to position the face of the electronic flash unit against the face of the pillow. However, because different electronic flash units are different sizes, in order to be adaptable for use with different electronic flash units, various-size hoods must be provided. Further, if the hood does not fit properly, the electronic flash unit could skew or pivot, and the light would not be reflected properly. I have discovered an extremely simple connection system which is universal in enabling any conventional electronic flash unit to be snugly connected to my reflector or diffuser system.

It is an object of the present invention to provide a reflector or diffuser system using an inflatable air pillow and thereupon providing a system which is extremely light in weight to avoid placing stress or added weight upon the photographer's equipment.

It is also an object of the present invention to provide a reflector system for an electronic flash unit which is simple in construction and easy to manufacture.

Another object of the present invention is to provide a reflector system for an electronic flash unit which is compact and can be carried within an ordinary gadget bag.

A further object of the present invention is to provide a reflector system for an electronic flash unit, which reflector system can be hung without requiring connection to an expensive or complex stand.

Another object of the present invention is to provide a diffuser system for an electronic flash which is simple in construction and is easy to manufacture.

A further object of the present invention is to provide a diffuser system for an electronic flash which enables inexpensive, rapid and easy connection of an electronic flash to the system and which does not require a complex stand for use thereof.

Other objects and advantages of the invention will become apparent as the description proceeds.

SUMMARY OF THE INVENTION

In accordance with the present invention, there is provided a relector or diffuser system for an electronic flash which comprises an inflatable pillow having a front ply and a back ply. A valve is carried by the pillow for enabling inflation of the pillow, and a resilient strap is provided for connection to the pillow for securing an electronic flash to the pillow by overlying the electronic flash and urging it tightly against one of the plies.

In the illustrative embodiment, means are carried by one ply of the pillow for connecting to a filter and for positioning the filter between the one ply and the face of the electronic flash. In the illustrative embodiment, the resilient strap comprises only a single strap that is fastened at its opposite ends to the pillow.

In the reflector system of the illustrative embodiment, the front ply of the pillow is light transmissive and the back ply is light opaque, with the back ply having a generally white inside surface. In the diffuser system of the illustrative embodiment, both the front and back plies are light transmissive, to permit the light emitted by the flash to be transmitted through both plies and the inflating fluid, which preferably is air.

A more detailed explanation of the invention is provided in the following description and claims, and is illustrated in the accompanying drawings.

BRIEF DESCRIPTION OF THE DRAWINGS

FIG. 1 is a front view of a reflector system constructed in accordance with the principles of the present invention;

FIG. 2 is a left-side elevation thereof;

FIG. 3 is a perspective view thereof;

DETAILED DESCRIPTION OF THE ILLUSTRATIVE EMBODIMENT

Figure 4:
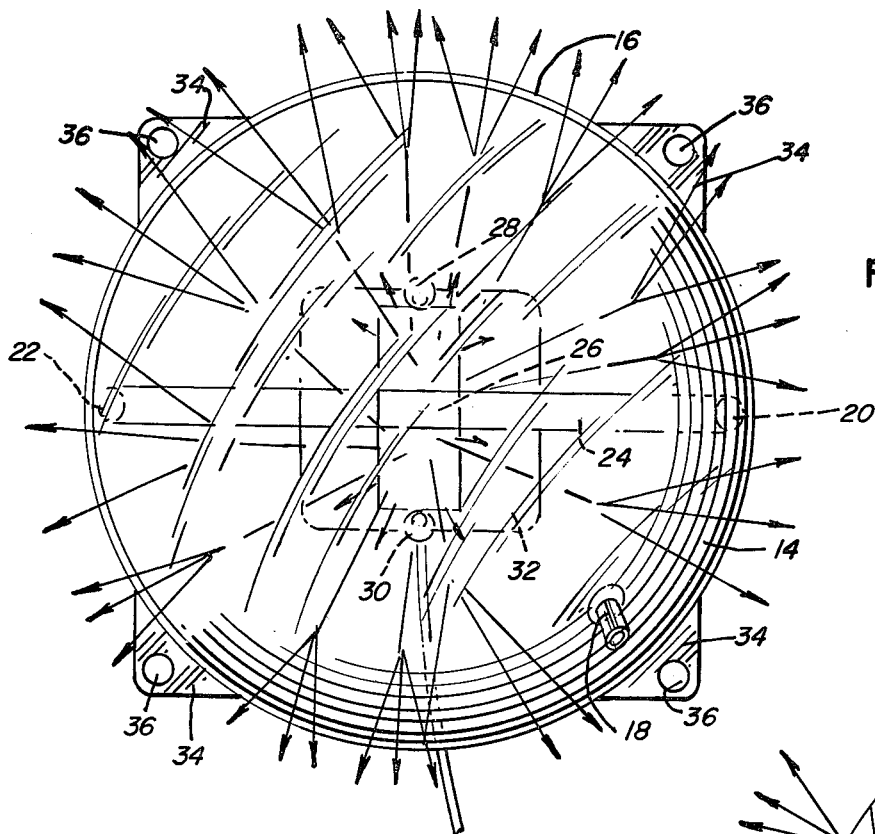
FIG. 4 is a front view of a diffuser system constructed in accordance with the principles of the present invention.

Referring to FIGS. 1 to 3 of the drawings, a reflector system for an electronic flash is shown therein. The reflector system comprises a pillow 10 including a front ply 12 and a rear ply 14. Plies 12 and 14 are preferably formed of a flexible vinyl plastic material and are sealed by heat sealing or any suitable sealing means along seam 16.

A conventional inflating valve 18 is connected to rear ply 14 to enable pillow 10 to be inflated with air or any other suitable inflation fluid. Front ply 12 is light transmissive, preferably transparent, and rear ply 14 is light opaque. It is preferred that rear ply 14 be coated on the inside with a reflective coating such as a pebble finish white or silver paint and, in order to provide substantial opaqueness, it is preferred that the outside of rear ply 14 be coated with a black coating, preferably black paint.

A pair of buttons 20, 22 are fastened to front ply 12 for enabling a resilient strap 24 to be connected thereto. Resilient strap 24 is preferably formed of latex rubber for substantial elasticity, and preferably comprises only a single strap defining apertures at opposite ends for engaging buttons 20 and 22. In this manner, an electronic flash unit 26 is placed against front ply 12 with the face of the electronic flash unit facing the front ply 12. Strap 24 is then coupled between buttons 20 and 22 to overlie the electronic flash and urge it tightly against front ply 12. This simple holding device is satisfactory for securing a conventional electronic flash to pillow 10.

A pair of spaced buttons 28, 30 are fastened to front ply 12, to enable the connection of a filter 32 between the electronic flash 26 and the front ply 12. Various filters may be employed having different colors and densities, as preferred by the photographer. The filters 32 define slots 33 on opposite ends thereof, to receive buttons 28, 30, as shown most clearly in FIG. 3.

A plurality of ears 34, preferably four ears, are connected to pillow 10 by sealing them within seam 16. Each of the ears 34 defines an aperture 36 which is utilized for hanging the reflector 10 as desired. In this manner, any suitable cord or wire may be used to hang the reflector from a fixture or the like.

When reflector 10 is not in use, it may be deflated and folded to fit in a photographer's gadget bag. Although no limitation is intended, an example diameter of a suitable pillow is 12 inches. Of course the pillow may be larger or smaller if desired, and may take other shapes than circular. In use, the pillow is inflated by a valve 18 and if desired, a filter is attached to the reflector pillow by connecting the filter so as to receive buttons 28, 30 within slots 33 of the filter. One end of the strap 24 is then connected to one of the buttons, 20, 22, the electronic flash is placed with its face toward front ply 12 and the other end of the strap is then connected to the pillow so as to urge the electronic flash tightly against the pillow as shown in FIGS. 1 to 3. When the electronic flash is discharged, the light emitted will be transmitted through front ply 12, will bounce off the reflective inside surface of rear ply 14 wnd will be returned toward the subject through the light transmissive front ply 12.

Figure 5:
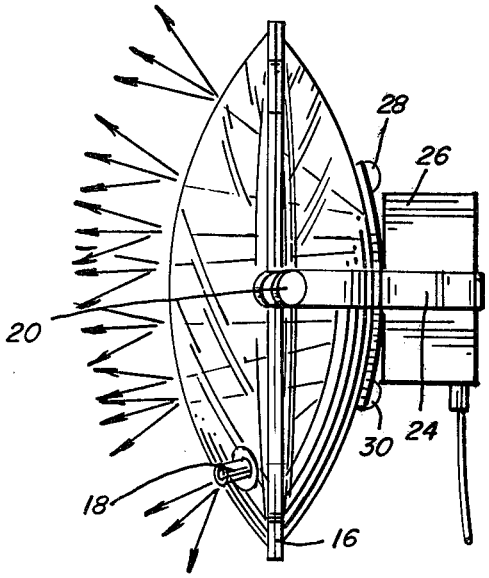
FIG. 5 is a right-side elevation thereof.
Figure 6:
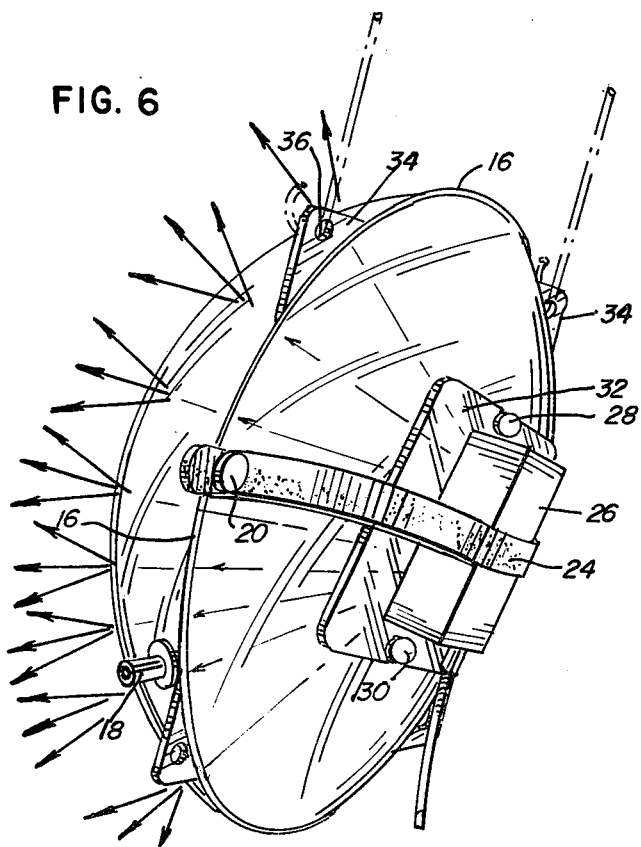
FIG. 6 is a perspective view thereof.

The diffuser system of FIGS. 4-6 is similar in many respects to the reflector system of FIGS. 1-3 and identical numerals have been used in FIGS. 4 to 6 to represent identical structures of FIGS. 1 to 3. However, in the diffuser system of FIGS. 4 to 6, front and rear plies are preferably translucent so that the light emitted from the electronic flash unit will be transmitted through both plies and the inflating fluid. The plies will preferably have a translucency to enable satisfactory diffusion of the light.

If desired, one of the plies could be transparent with the other ply being translucent.

Thus the basic difference between the diffuser system of FIGS. 4 to 6 and the reflector system of FIGS. 1 to 3 is in the color and/or light transmissiveness of the plies. In the reflector system, the inside of the rear ply 14 is coated with a reflective finish for reflection, with the outside of the rear ply 14 having a substantially black coating. In the diffuser system, the plies may be transparent or translucent or one of the plies may be transparent while the other ply is translucent. In addition, in both embodiments filters may be used with the filters having various colors such as yellow, amber, blue, green, red or smoke (grey).

It is seen that a reflector or diffuser system for an electronic flash unit has been provided, which is extremely simple in construction and affords unusual portability and ease in attaching the electronic flash to the reflector or diffuser system. Further, filters may be employed as desired and the system may be hung by simple hanging means.

Although two illustrative embodiments of the invention have been shown and described, it is to be understood that various modifications and substitutions may be made by those skilled in the art without departing from the novel spirit and scope of the present invention.

What is claimed is:

1. A reflector or diffuser system for an electronic flash which comprises:
    an inflatable pillow having a front ply and a back ply;
    a valve carried by said pillow for enabling inflation of said pillow;
    a resilient strap for connection to said pillow for securing an electronic flash to said pillow by overlying said electronic flash and urging it tightly against one ply; and
    means carried by said one ply for connecting to a filter and for positioning the filter between said one ply and the face of the electronic flash.

2. A system as described in claim 1, said resilient strap comprising only a single strap that is fastened at its opposite ends to said pillow.

3. A system as described in claim 1, said filter connecting means comprising a pair of spaced buttons carried by one ply for receiving a filter between the buttons.

4. A system as described in claim 3, said filter comprising a flexible sheet member defining slots for receiving said buttons.

5. A system as described in claim 1, including means connected to said pillow for hanging said pillow, said hanging means comprising a plurality of ears extending from said pillow, each of which defines an aperture.

6. A reflector system for an electronic flash, which comprises:
    an inflatable pillow having a front ply and a back ply, said front ply being light transmissive, and said back ply being light opaque, said back ply having a reflective inside surface;
    a valve carried by said pillow for enabling inflation of said pillow; and
    a resilient strap for connection to said pillow for securing an electronic flash to said pillow by overlying said electronic flash and urging it tightly against said front ply.

7. A reflector system as described in claim 6, including means carried by said front ply for connecting to a filter and for positioning the filter between said front ply and the face of the electronic flash.

8. A reflector system as described in claim 6, said resilient strap comprising only a single strap that is fastened at its opposite ends to said pillow.

9. A reflector system as described in claim 7, said filter connecting means comprising a pair of spaced buttons carried by said front ply for receiving a filter between the buttons.

10. A reflector system as described in claim 9, said filter comprising flexible sheet members defining slots for receiving said buttons.

11. A reflector system as described in claim 6, including means connected to said pillow for hanging said pillow, said hanging means comprising a plurality of ears extending from said pillow, each of which ears defines an aperture.

12. A reflector system as described in claim 6, said back ply having a substantially black outside surface.

13. A diffuser system for an electronic flash, which comprises:
   an inflatable pillow having a front ply and a back ply, with both of said plies being light transmissive;
   a valve carried by said pillow for enabling inflation of said pillow; and
   means for holding an electronic flash against one of said plies, to permit the light emitted by said flash to be transmitted through both plies and the inflating fluid.

14. A diffuser system as described in claim 13, said holding means comprising a resilient strap for connection to said pillow for securing an electronic flash to said pillow by overlying the electronic flash and urging it tightly against one of said plies.

15. A diffuser system as described in claim 14, including means carried by said one ply for connecting to a filter and for positioning the filter between said one ply and the face of the electronic flash.

16. A diffuser system as described in claim 15, said resilient strap comprising only a single strap that is fastened at its opposite ends to said pillow.

17. A diffuser system as described in claim 15, said filter connecting means comprising a pair of spaced buttons carried by said one ply for receiving a filter between the buttons.

18. A diffuser system as described in claim 17, said filter comprising a flexible sheet member defining slots for receiving said buttons.

19. A diffuser system as described in claim 13, including means connected to said pillow for hanging said pillow, said hanging means comprising a plurality of ears extending from said pillow, each of which ears defines an aperture.

* * * * *